(12) United States Patent
Chien

(10) Patent No.: US 7,618,150 B2
(45) Date of Patent: Nov. 17, 2009

(54) MULTIPLE LEDS LIGHT WITH ADJUSTABLE ANGLE FEATURES

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 0 days.

(21) Appl. No.: 11/806,711

(22) Filed: Jun. 4, 2007

(65) Prior Publication Data

US 2007/0236931 A1   Oct. 11, 2007

(51) Int. Cl.
  *F21V 21/30*   (2006.01)
(52) U.S. Cl. ............... 362/35; 362/249.02; 362/249.09
(58) Field of Classification Search .................. 362/35, 362/231, 240, 249, 249.02, 249.09
See application file for complete search history.

(56) References Cited

U.S. PATENT DOCUMENTS

| 6,592,423 | B1 * | 7/2003 | Boyle et al. | 446/175 |
| 6,705,745 | B1 * | 3/2004 | Pederson | 362/284 |
| 7,210,816 | B2 * | 5/2007 | Lin | 362/234 |

* cited by examiner

*Primary Examiner*—John A Ward
(74) *Attorney, Agent, or Firm*—Bacon & Thomas, PLLC

(57) ABSTRACT

A multiple LED light device with adjustable angle function has multiple LED-units, each including a housing and extensions that fit within tracks to adjust the LED's light beam angle, thereby enabling a plurality of the LED-units to direct light beams to different desired locations.

20 Claims, 5 Drawing Sheets

MULTIPLE LEDS LIGHT WITH ADJUSTABLE ANGLE FEATURES

BACKGROUND AND SUMMARY OF THE INVENTION

This application is related to copending U.S. patent application Ser. Nos. 10/883,747; 11/092,741; 11/094,215; 11/255,981; 11/498,881; 11/527,631; 11/498,874; 11/527,629; 11/527,628; and Ser. No. 11/806,284.

The inventor's co-pending U.S. patent application Ser. No. 11/255,981 discloses a multiple light source night light and the inventor's co-pending U.S. patent application Ser. No. 11/806,284 discloses a night light with more than one optics medium. Both disclosures offer substantial benefits when applied to light emitting diode devices (hereafter as LED) because they eliminate the spot light effect of the LED and provide a smoother output that looks more like a conventional non-LED light means such as an incandescent bulb, fluorescent tube, or halogen bulband thereby make the current multiple LED light become very useful to human beings.

The current invention uses a plurality of LEDs with more than one optics medium to provide a multiple LED light that is useful for a variety of applications including a night light, indoor lighting, cabinet light, under table light, decorative lighting, anywhere light, reading light, painting light, floor light, bathroom light, and outdoor lighting by expanding the narrow viewing angle of the LED light source to become a surface light that resembles the light output of a conventional incandescent bulb, florescent tube, halogen bulb or other type of light available in the market place.

The current invention further incorporates adjusting means to enable the multiple LED light to have adjustable functions so that the multiple LED light can be practically installed anywhere, including indoor, outdoor, and public areas.

The current invention not only provides a simple to install LED light, but also provides excellent light performance. The Multiple LED light with more than one LED and more than one optics means with adjustment means makes the multiple LED light become very useful to people and supply great and convenient illumination to all human beings.

DETAILED DESCRIPTION OF THE PREFERRED EMBODIMENTS

Figure 1:
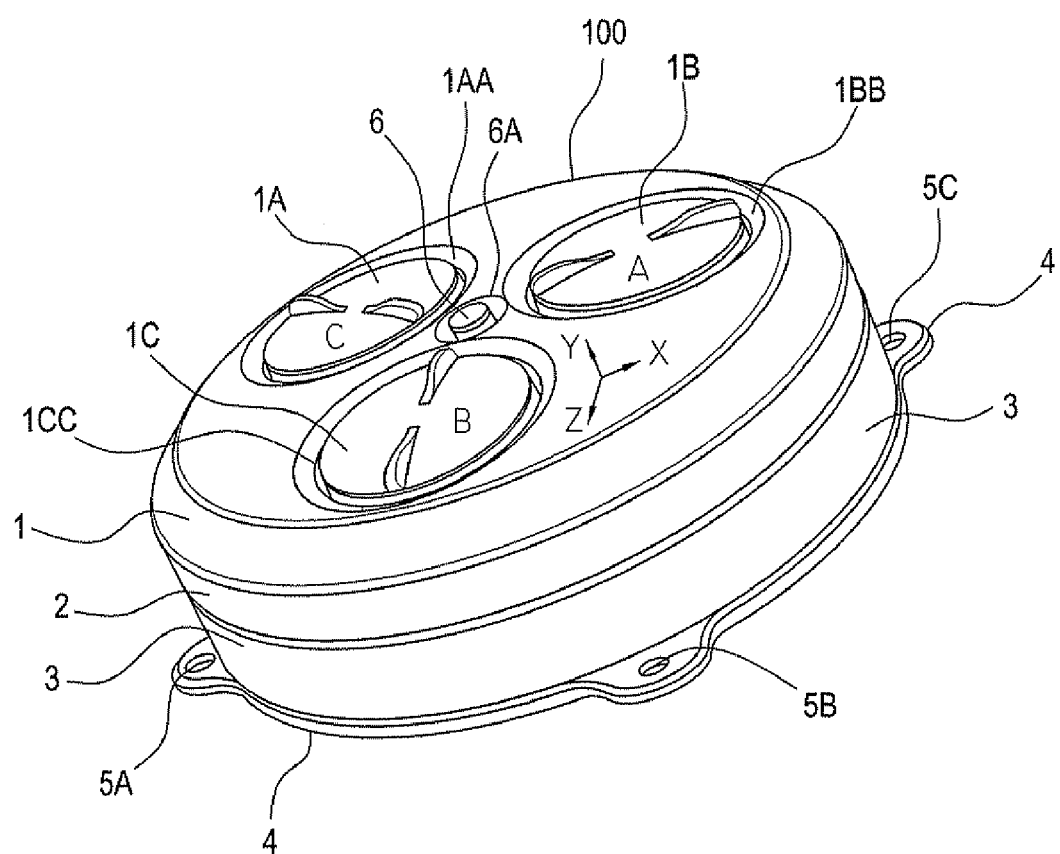
FIG. 1 is an isometric view of a first preferred embodiment of a multiple LED light with adjustable angle features.

FIG. 1 shows an embodiment of the current invention, in the form of a multiple LED light device with adjustable angle features (100) which has a top cover (1), tray (2), battery compartment (3), and attachment base (4). The cover (1) has a plurality of holes (1A) (1B) (1C) to allow a plurality of LED-units to fit within. Each of the LED-units has a lens (1B), housing (not shown here), LED (not shown), and swivel means (not shown). Each of the LED-units can be swiveled vertically with respect to a horizontal-axis (X-axis) a predetermined number of degrees up and down and can be rotated horizontally with respect to a vertical-axis (Y-axis) a predetermined number of degrees right and left to enable each LED's light beam to be directed to a desired position when the said multiple LEDs light device has been fixed in a desired position.

Figure 5:
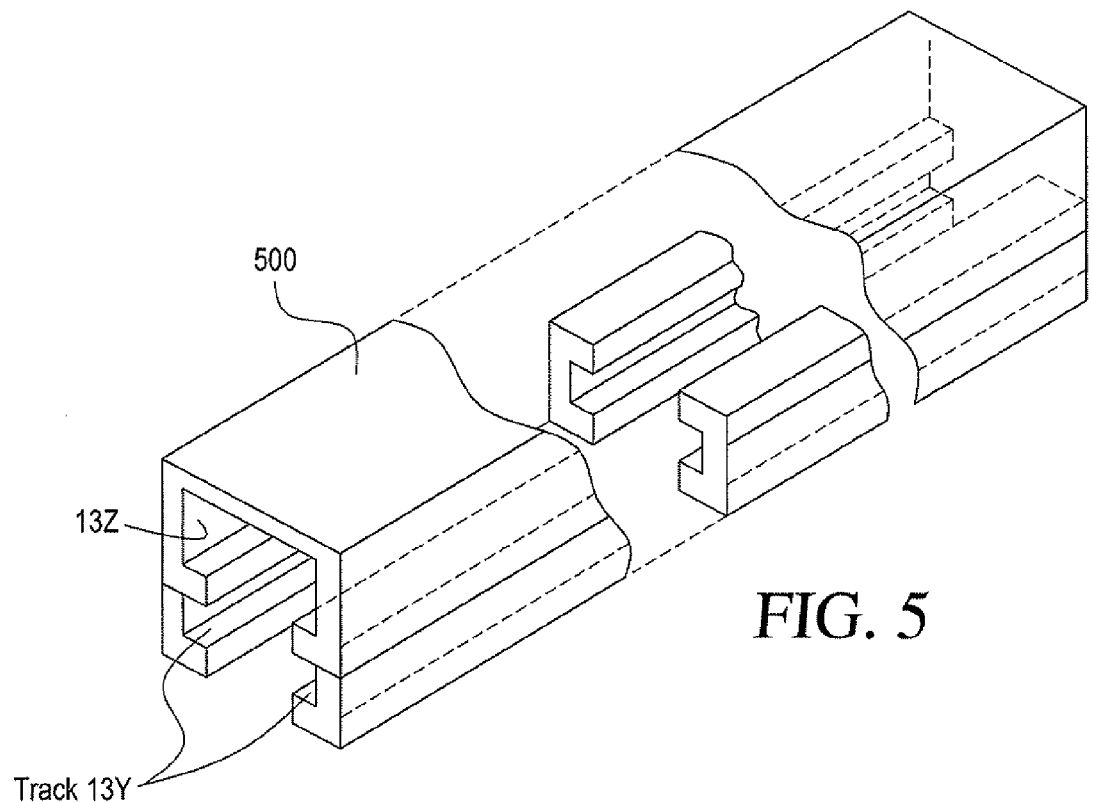
FIG. 5 is an isometric view showing track-means for a multiple LEDs light device according to a second preferred embodiment.
Figure 6:
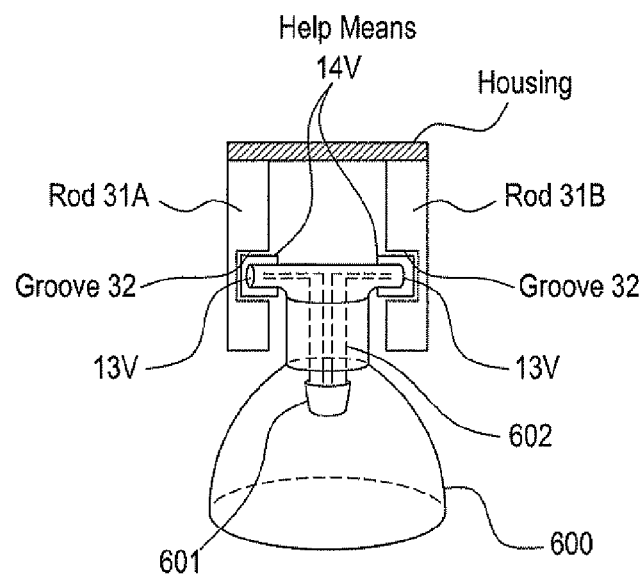
FIG. 6 is an end view of the second preferred embodiment with alternative track-means.

The tray (2), battery compartment (3), and attachment base (4) are assembled together to allow the multiple LED light device to be fixed on a desired surface. As shown in FIG. (2), the multiple LED light device (200) includes the top cover (1) preferably with three holes (19A) (19B) (19C) to allow the 3 LED-Units to be fitted into these (3) holes. Each LED-unit has a lens (11), reflective housing (12), extensions (13), and help-means (14) to enable the LED-unit to be installed on the track (16) and rotated horizontally the track (16) with respect to the cover surface a predetermined number of degrees right or left until the stopper (15) is engaged. The two extensions (13) allow the LED-unit to swivel vertically for a predetermined number of degrees up or down until the housing (12) hits the stopper of the tray or cover. These LED-units can have both a swivel and rotating housing along the vertical and horizon direction of the cover surface so that each of the LED-units can emit the inner LED's light beam to any direction as desired. From FIG. 2, the tray (2) has a track construction (16) to allow the extensions (13) to fit therein to get the swivel function. The number of tracks will depend on market requirements and is not limited to three as in the current preferred embodiment. It can be any number and size to match the LED-unit size. The LED-unit size can be very small, around 3 mm or 5 mm or 10 mm, or larger or smaller, depending on marketing requirements. It will be appreciated that the plurality of LED-units and track-construction can be arranged in any number, such as in an array-arrangement having 100 pieces arranged vertically and 100 pieces arranged horizontally, which spacing can be any distance, i.e., the scope of the current invention is not to be limited to a particular number and arrangement of the LED-units, and that the arrangement may be varied to accommodate different geometric surfaces in a variety of dimensions for any number of desired LED-units. For example, the LED-units can be arranged as illustrated in FIG. 5 described in more detail below, to have rod-shape (31A) (31B) surfaces with each of the LED-units (400) having extensions (13U) (13V) to fit into the grooves (32) so that a certain quantity of similar LED-Units (400) may be arranged in an elongated shape or linear shape for cabinet light fixtures. Hence, the number of the LED-units, the arrangement of the LED-units, the geometric shape of the surfaces of the light device are all variable depending on market requirements, and all of these variable details are intended to still fall within the current scope of the claims.

Figure 2:
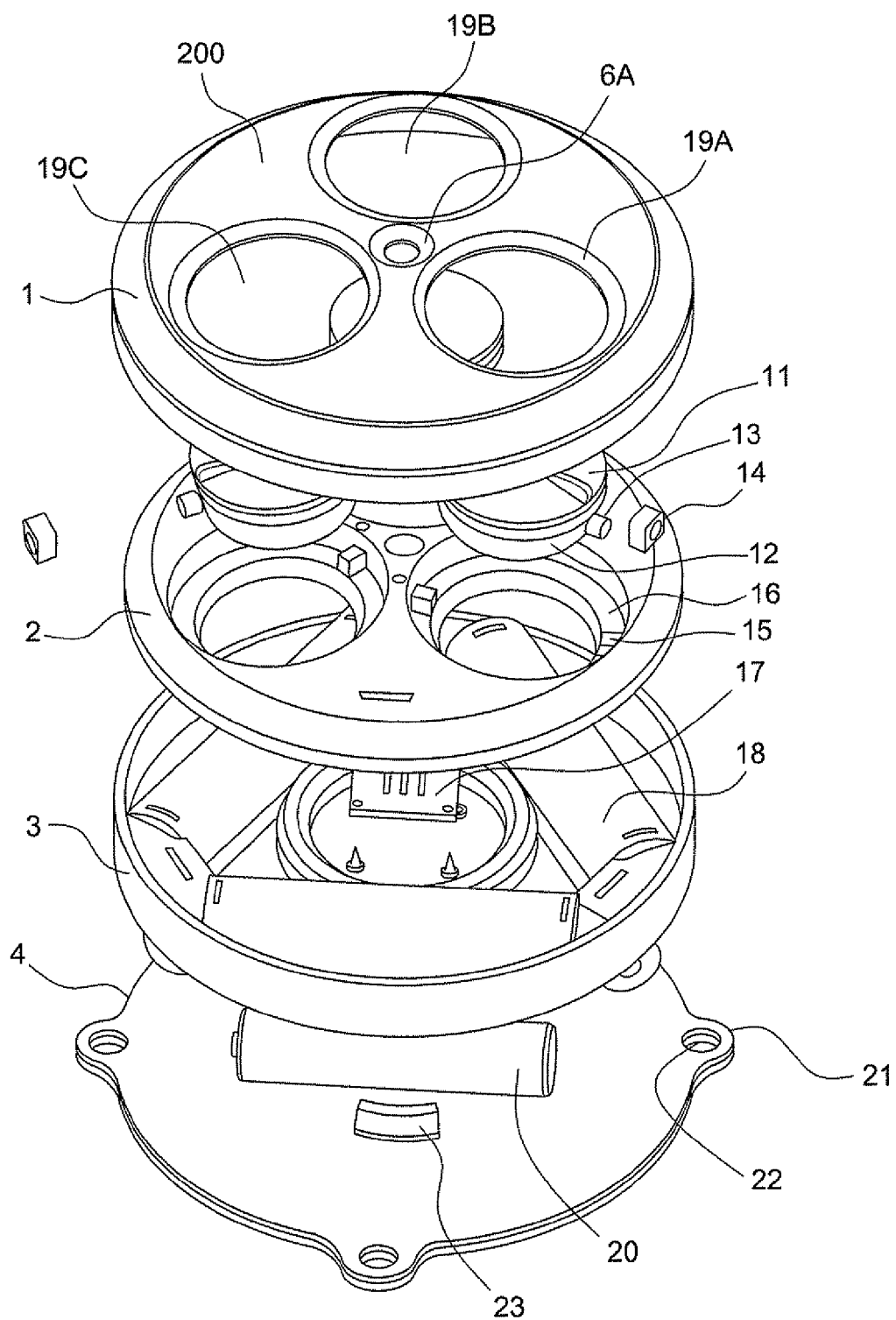
FIG. 2 is an exploded isometric view showing construction details of the first preferred embodiment.

FIG. 2 further shows help-means (14) which may be in a round nut-shape which can be fitted on the end of the extensions (13), like a wheel and tire on an axle, to make the extensions (13) move much more smoothly on the track (16). This is optional. The help-means also can have a nut-shape but with gear-teeth on the outside so as to cause as clicking sound during rotation and precise movement because of the teeth construction on the nut-edge. There are numerous ways to make the extensions move on the track and all are intended to fall within the scope of the invention.

As shown in FIG. 2, the cover (1) and tray (2) are assembled together by conventional assembly means so the LED-units can be well installed and can be freely adjustable to desired angles. Each LED (not shown) has electric-means to connect with the circuit board (17) to cause each LED to have predetermined illumination functions. The functions may be provided by currently-available circuitry, and may be selected from on, off, sequential, flashing, random, pair-flash, fade-in and fade-out, chasing, or any other light performance functions which can be driven by electric signals from a conventional circuit or an integrated circuit (I.C.). The circuit board may further include switch-means which may include a manual switch, photo sensor, other sensor means, moisture sensor, fire sensor, heat sensor, metal sensor, electric sensor or mechanical sensor, timer, and/or PIR sensor to turn the multiple LEDs device with adjustable angle function on and off under predetermined functions and for a duration determined by the switch-means.

The circuit (17) may be connected with a desired power source (18) which may have different voltages and currents. The circuit (17) can, for example, connect with a 110 Volt 60 Hz home electricity system or a direct current system as long as the circuit (17) can provide correct LED current specifications from the selected power source (may in AC or DC type). This means the circuit can be designed for a DC power source or can be another design which can work with an AC power source. All these circuit are available from the market place so we do not discuss here. As shown in FIG. (2), the preferred embodiment is a DC (Direct Current power source) which is in the form of the battery-set. The battery set have a desired working voltage and capacity depending on the LED's specification. Some LEDs can be turned on by lower voltage such as 1.68 Volt DC, while some LEDs need a higher voltage such as 4.5 Volt, so this will be variable according to the LED's specification. The LED's color and its construction will determine the final design for the battery-set's number and capacity, so any alternative specification will still fall within the current invention scope. In this embodiment, the battery-set is made up of three pieces of 1.5 Volt batteries in series to drive white color LEDs, although alternative battery-sets and different electric connections for different numbers will still fall within the current invention scope.

As shown in FIG. 2, The battery compartment (3) has a plurality of battery-sets (18) and circuit (17) fitted within. The circuit (17) has conductive-means to provide the electric connection to deliver the electric signals from the power source (18) (here preferred as a battery-set) to the plurality of LEDs. An optional electric-component, electric-device, mechanical-device, switch-means, timer-device, sensor-device, and/or IC may added between to provide the required functions and light effects. The battery-compartment (3) has an attachment means (22) or (23) or other phone-hook device (not shown here), double-side tape or form-tape, glue, or other equivalent attachment-means on the attachment-base (4) to cover the said battery-compartment (3) and allow people to install the multiple LED light device on the desired surface.

Figure 3:
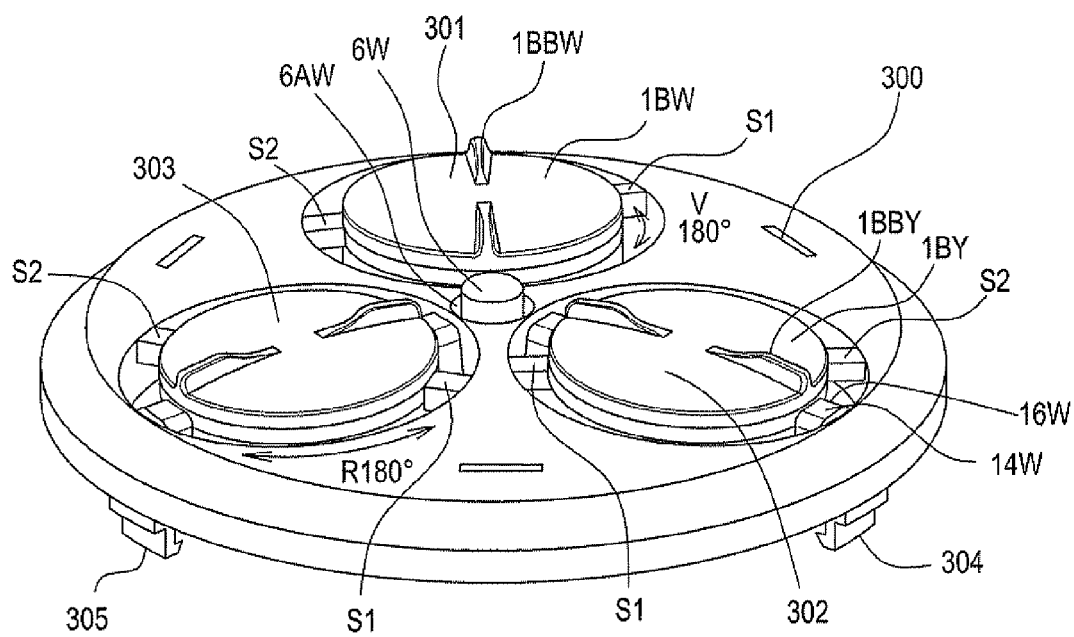
FIG. 3 is an isometric view showing further details of the first preferred embodiment.
Figure 4:
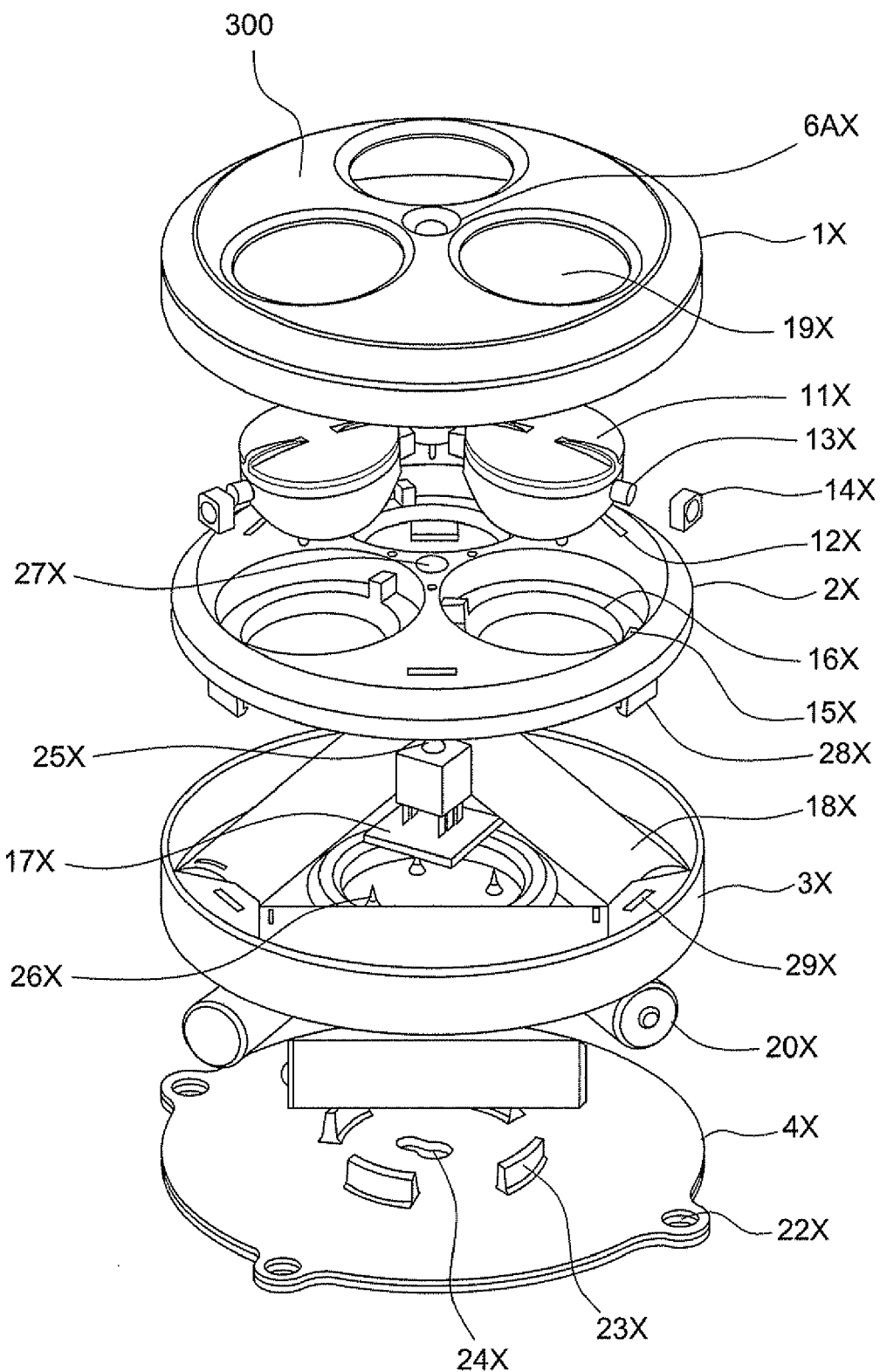
FIG. 4 is an exploded version of the isometric view of FIG. 3.

As shown in FIG. 3, the tray (302) of the preferred embodiment has three holes to fit the three LED-units (301) (302) (303). Each LED-unit (301) (302) (303) has a track (16W) and extensions (14W) are fit in the respected track (16W) with stoppers (S1) (S2) to enable the LED-units (301) (302) (303) to vertically swivel up to 180 degrees (V180) and horizontally rotate up to 180 degree (R180). The center of the tray (300) has one opening or window (6AW) to allow the switch-means (6W) to be activated though the opening (6AW) or the window. If this is an opening, the switch-means should be up on the surface. If this is a window, the switch-means should be lower than the surface. The market place has a lot of different switch-means that can be selected for certain applications.

FIG. (4) shows further details of the arrangement illustrated in FIGS. (1), (2), (3), as described above. It will be appreciated that all the alternative, replaceable, equivalent functions of any parts discussed above should still fall within the current invention's scope.

FIG. (5) illustrates that the track means design (500) can have an elongate shape with a lower track (13Y) and an upper track means (13Z).

FIG. (6) is a front view of the rod (31A) and rod (31B), both having a groove (32) to allow the LED-unit (600) to fit within the groove (32) and move freely to adjust the angle. The help-means (14) as above discussed is optional to offer the above-described functions to the LED-unit. The help-means can be incorporated with the extensions to cause the LED-units to move freely to an adjustable angle, to be fixed in position, to be secured on the track-means, and to provide electric signal delivery. The design and construction of the help-means can be any type from the conventional market place as long as it incorporates the LED-unit's extensions to fasten, deliver current signal, adjust angle, and offer space to fix the LED-units.

It will be appreciated that the above discussed preferred embodiments are not intended to limit the scope of the current invention, and that any alternative or equivalent functions of design will still within the scope of the invention. Any alternative or equivalent arrangement, process, installation or design modification of the current invention will still fall within the scope of the current invention.

The invention claimed is:

1. A multiple LED light device having an adjustable angle function, comprising:

a device housing;

at least one LED unit having extensions that fit within respective tracks, wherein the tracks have any geometric shape that permits the LED unit to be moved in a first plane, the LED unit also being movable about the extensions in a second plane to enable light beams from the LED unit in a desired direction, and wherein said LED unit includes a lens and a reflective housing which are separate pieces;

circuit and power means within said housing for supplying electric signals to cause said LED unit to emit said light beams; and attachment means for installing the light device on an surface.

2. A multiple LED light device having an adjustable angle function as claimed in claim 1, wherein said extensions are freely movable within said track to enable said LED-unit to be moved to a desired angle when a force is applied to said LED-unit.

3. A multiple LED light device having an adjustable angle function as claimed in claim 1, wherein said power means changes incoming DC or AC current into a current and voltage for triggering an LED in said LED unit.

4. A multiple LED light device having an adjustable angle function as claimed in claim 1, wherein the light device is adapted for use indoors, outdoors, in cars, trucks, vans, boats, vessels, airliners, recreational vehicles, and in any area inhabited by human beings.

5. A multiple LED light device having an adjustable angle function as claimed in claim 1, wherein the attachment means comprises glue, double-sided tape, foam tape, hook and loop tape, chemical adhesives, a screw, a phone hook, a catch, or a rivet.

6. A multiple LED light device having an adjustable angle function as claimed in claim 1, wherein the tracks includes stoppers for limiting movement of said LED unit beyond a predetermined angle.

7. A multiple LED light device having an adjustable angle function as claimed in claim 1, wherein the tracks are curved and said LED unit is therefore cause to rotate when said extensions are moved in said path, said LED unit being additionally free to swivel about said extensions in a second place different from the plane of rotation.

8. A multiple LED light device having an adjustable angle function as claimed in claim 1, wherein the LED unit is one of a plurality of units having a desired size, dimension, surface arrangement, and number of units.

9. A multiple LED light device having an adjustable angle function as claimed in claim 1, further comprising means for causing LEDs in the device to exhibit predetermined lighting functions.

10. A multiple LED light device having an adjustable angle function as claimed in claim 1, further comprising help means incorporated into said extensions for enabling the LED unit to be moved, fixed in position, tightened on the tracks, and to provide electric signal delivery to the LED unit.

11. A multiple LED light device having an adjustable angle function, comprising:
   a device housing;
   at least one LED unit having extensions that fit within respective tracks, wherein the tracks have any geometric shape that permits the LED unit to be moved in a first plane, the LED unit also being movable about the extensions in a second plane to enable light beams from the LED unit in a desired, wherein said LED unit includes an integral lens, reflective housing, and extensions;
   circuit and power means within said housing for supplying electric signals to cause said LED unit to emit said light beams; and
   attachment means for installing the light device on an surface.

12. A multiple LED light device having an adjustable angle function as claimed in claim 11, wherein said extensions are freely movable within said track to enable said LED-unit to be moved to a desired angle when a force is applied to said LED-unit.

13. A multiple LED light device having an adjustable angle function as claimed in claim 11, wherein the tracks are curved and said LED unit is therefore cause to rotate when said extensions are moved in said path, said LED unit being additionally free to swivel about said extensions in a second place different from the plane of rotation.

14. A multiple LED light device having an adjustable angle function as claimed in claim 11, wherein the LED unit is one of a plurality of units having a desired size, dimension, surface arrangement, and number of units.

15. A multiple LED light device having an adjustable angle function as claimed in claim 11, further comprising help means incorporated into said extensions for enabling the LED unit to be moved, fixed in position, tightened on the tracks, and to provide electric signal delivery to the LED unit.

16. A multiple LED light device having an adjustable angle function as claimed in claim 11, wherein the tracks are curved and said LED unit is therefore cause to rotate when said extensions are moved in said path, said LED unit being additionally free to swivel about said extensions in a second place different from the plane of rotation.

17. A multiple LED light device having an adjustable angle function, comprising:
   a device housing;
   at least one LED unit having extensions that fit within respective tracks, wherein the tracks have any geometric shape that permits the LED unit to be moved in a first plane, the LED unit also being movable about the extensions in a second plane to enable light beams from the LED unit in a desired, wherein said LED unit incorporates optics means for increasing an angle of illumination of an LED within the LED unit;
   circuit and power means within said housing for supplying electric signals to cause said LED unit to emit said light beams; and
   attachment means for installing the light device on an surface.

18. A multiple LED light device having an adjustable angle function as claimed in claim 17, wherein said extensions are freely movable within said track to enable said LED-unit to be moved to a desired angle when a force is applied to said LED-unit.

19. A multiple LED light device having an adjustable angle function as claimed in claim 17, wherein the LED unit is one of a plurality of units having a desired size, dimension, surface arrangement, and number of units.

20. A multiple LED light device having an adjustable angle function as claimed in claim 17, further comprising help means incorporated into said extensions for enabling the LED unit to be moved, fixed in position, tightened on the tracks, and to provide electric signal delivery to the LED unit.

* * * * *